(12) United States Patent
Ochi (10) Patent No.: US 7,686,380 B2
(45) Date of Patent: Mar. 30, 2010

(54) ELECTRICAL FEEDING UNIT AND CABLE HOLDER

(75) Inventor: Hideki Ochi, Ashigarakami-gun (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 401 days.

(21) Appl. No.: 11/714,335

(22) Filed: Mar. 6, 2007

(65) Prior Publication Data

US 2007/0209284 A1   Sep. 13, 2007

(30) Foreign Application Priority Data

Mar. 7, 2006  (JP) .............................. 2006-061521
Dec. 4, 2006  (JP) .............................. 2006-327126

(51) Int. Cl.
*H02G 11/00* (2006.01)

(52) U.S. Cl. ................... 296/155; 174/72 A; 174/72 C; 49/360

(58) Field of Classification Search ................. 296/155; 49/360; 174/651, 659, 135, 72 C, 72 A
See application file for complete search history.

(56) References Cited

U.S. PATENT DOCUMENTS

| | | | |
|---|---|---|---|
| 5,215,338 A | 6/1993 | Kimura et al. | |
| 6,682,353 B2 * | 1/2004 | Bigotto | 439/34 |
| 6,818,827 B2 * | 11/2004 | Kato et al. | 174/72 A |
| 6,881,902 B2 * | 4/2005 | Aoki et al. | 174/72 A |
| 7,053,306 B2 * | 5/2006 | Tsubaki et al. | 174/72 A |
| 7,082,720 B2 * | 8/2006 | Kobayashi et al. | 49/360 |
| 7,086,687 B2 * | 8/2006 | Aoki et al. | 296/155 |
| 7,279,638 B2 * | 10/2007 | Kisu et al. | 174/72 A |
| 7,284,785 B2 * | 10/2007 | Gotou et al. | 296/155 |
| 7,381,897 B2 * | 6/2008 | Nishijima et al. | 174/72 A |
| 2002/0005014 A1 | 1/2002 | Doshita et al. | |
| 2003/0184119 A1 * | 10/2003 | Doshita et al. | 296/155 |
| 2005/0264033 A1 * | 12/2005 | Aoki et al. | 296/155 |

FOREIGN PATENT DOCUMENTS

| | | |
|---|---|---|
| EP | 1 378 400 A1 | 1/2004 |
| JP | 2004-040862 | 2/2004 |
| JP | 2005171479 A * | 6/2005 |

* cited by examiner

*Primary Examiner*—Patricia L Engle
(74) *Attorney, Agent, or Firm*—Young Basile

(57) ABSTRACT

A feeding unit for supplying electrical power along a cable is coupled to a slide door. When the slide door is substantially closed, a protrusion is vertically restricted by a groove to vertically restrict an end of a connecting cable by a holder. In contrast, when the slide door is open, the protrusion that is accommodated in the groove is capable of moving vertically and horizontally.

18 Claims, 6 Drawing Sheets

ELECTRICAL FEEDING UNIT AND CABLE HOLDER

CROSS-REFERENCE TO RELATED APPLICATION

This application claims priority from Japanese Patent Application Ser. Nos. 2006-061521, filed Mar. 7, 2006, and 2006-327126, filed Dec. 4, 2006, each of which is incorporated herein in its entirety by reference.

FIELD OF THE INVENTION

The invention relates in general to a feeding unit that supplies electrical power from a vehicle body to a slide door mounted to a side surface of a vehicle and a holder that allows for rotation of the power supply cable in more than one direction.

BACKGROUND

To electrically perform an opening/closing operation, a locking operation, etc., electrical power is supplied from a vehicle body side to a slide door that is mounted to a side surface of a vehicle. Feeding units that supply electrical power from the vehicle body side towards the slide door, such as that disclosed in Japanese Unexamined Patent Application Publication No. 2004-40862, are known. Such a feeding unit has a caterpillar structure.

SUMMARY OF THE INVENTION

Embodiments of a feeding unit for supplying electrical power are taught herein. One embodiment comprises a connecting cable mounted between a vehicle body and a slide door, wherein the slide door is mounted to a side surface of a vehicle, and wherein the connecting cable is configured to supply electrical power from a side of the vehicle body. This feeding unit also includes a holder for mounting a portion of the connecting cable to the vehicle body or the slide door, wherein the holder holds the portion of the connecting cable so that the portion of the connecting cable is rotatable vertically and horizontally, and wherein the holder vertically stops the portion of the connecting cable when the slide door is at a closed position.

Another example of a feeding unit taught herein comprises means for transmitting electrical power between a vehicle body and a slide door mounted to a side surface of a vehicle and means for mounting a portion of the transmitting means to either the vehicle body or the slide door, the mounting means supporting the portion of the transmitting means to be rotatable vertically and horizontally. Also, the mounting means vertically stops the portion of the transmitting means when the slide door is at a closed position.

A holding device of a cable is also taught herein. One such holding device comprises a holder for holding a section of the cable. The holder is configured to allow the section of the cable to rotate in a first main movement direction and a second movement direction perpendicular to the first main movement direction when the cable is at a first position on a line in the first main movement direction. The holder is further configured to stop the rotation of the section of the cable in the second movement direction when the cable is in a second position on the line in the first main movement direction.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

The caterpillar structure from the vehicle body side to the slide door of the known feeding unit disclosed in Japanese Unexamined Patent Application Publication No. 2004-40862 is complicated. Therefore, manufacturing costs are high, a large number of movable parts is used, and noise tends to be generated by vibration.

In contrast, embodiments of the invention provide a feeding unit that has a relatively simple structure, that is low in cost and that does not easily become a source of noise. Embodiments of the feeding unit supply electrical power from a vehicle body to a slide door mounted to a surface of a vehicle. The feeding unit includes a connecting cable mounted between the vehicle body and the slide door and a holder that mounts at least one end of the connecting cable to either the vehicle body or the slide door. The holder holds the end(s) of the connecting cable so that the end(s) are rotatable vertically and horizontally, and the holder vertically stops the end(s) of the connecting cable when the slide door is at a closed position.

This relatively simple structure allows the connecting cable to move smoothly while following the movement of the slide door. In addition, it is possible to reduce the number of movable parts as compared to that known in the art. Further, since rattling is restricted as a result of the end(s) of the connecting cable being stopped when the slide door is at its closed position, it is possible to correspondingly reduce vibration and noise.

Figure 1:
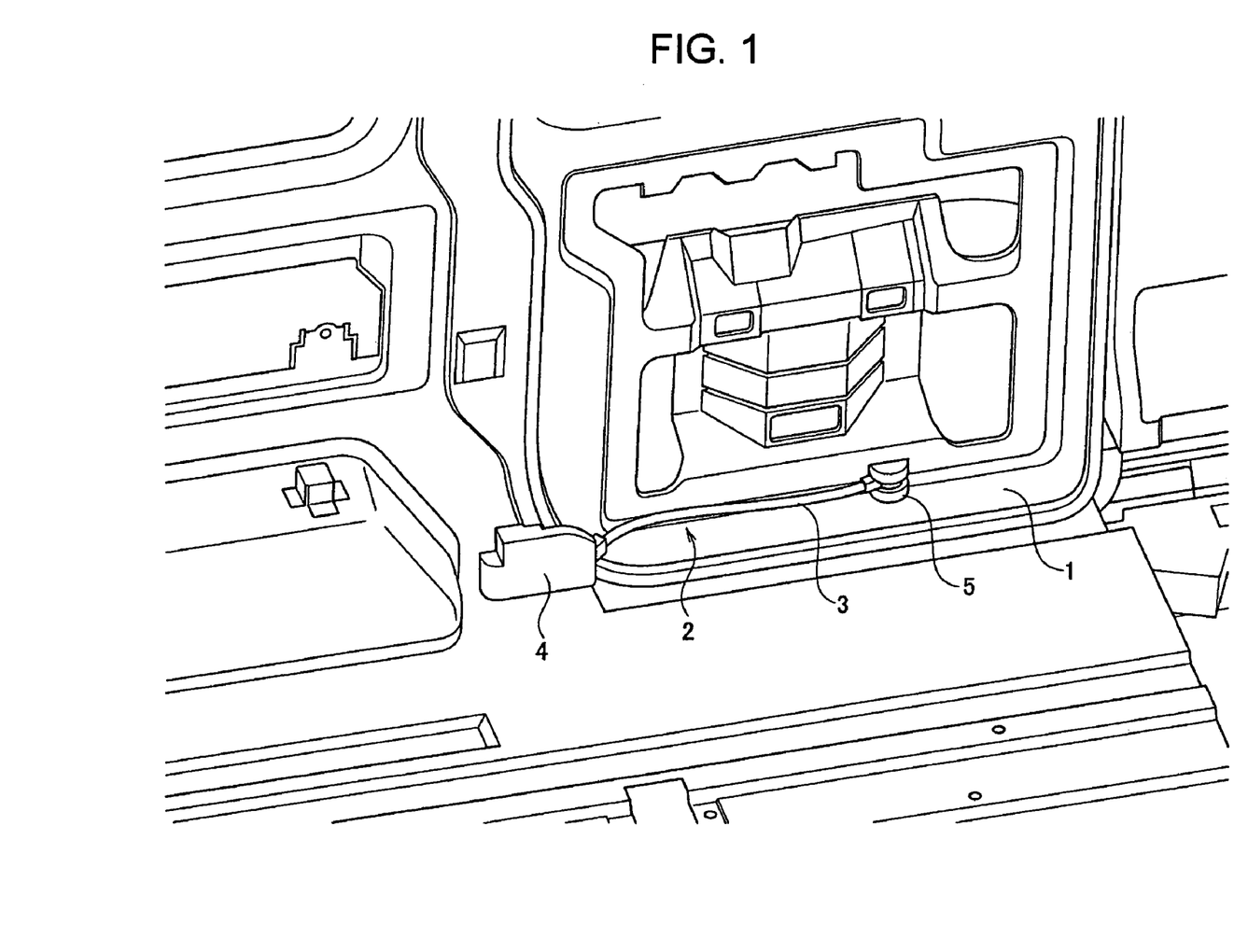
FIG. 1 is an external perspective view of a feeding unit according to a first embodiment of the invention when a slide door is closed.
Figure 2:
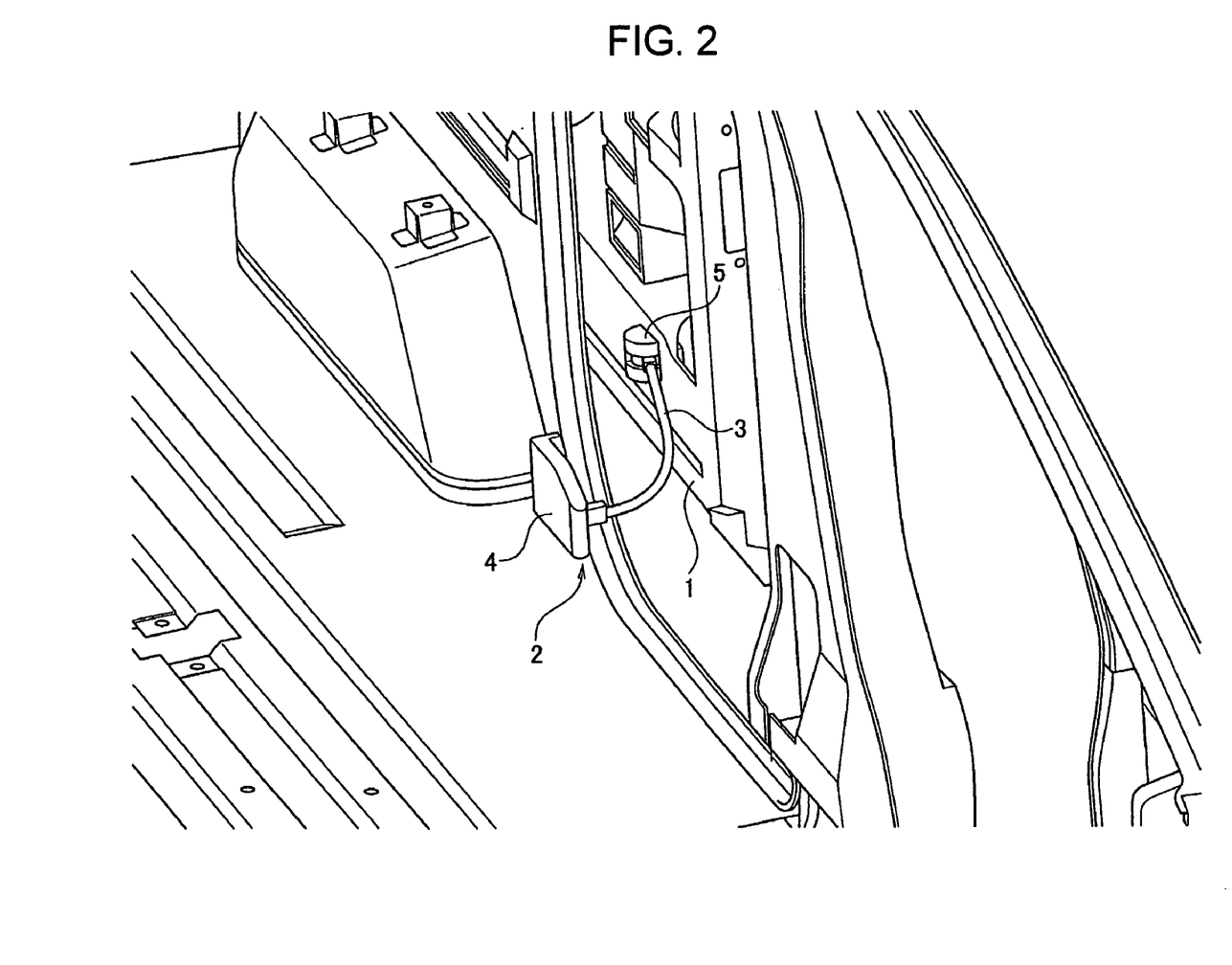
FIG. 2 is an external perspective view of the feeding unit according to the first embodiment when the slide door is open.
Figure 3A:
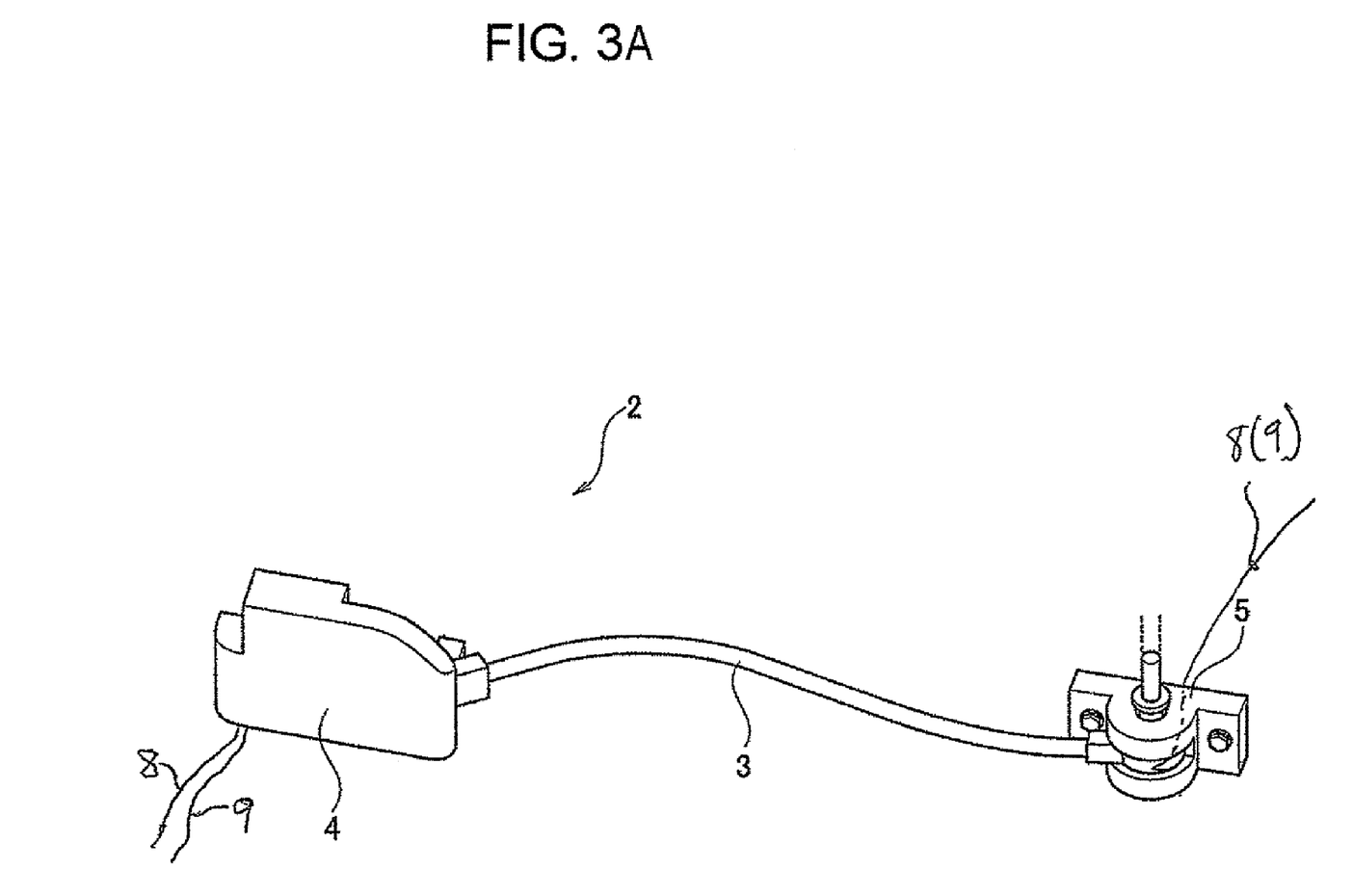
FIG. 3A is an enlarged perspective view of the feeding unit according to FIG. 1 in a closed position.
Figure 3B:
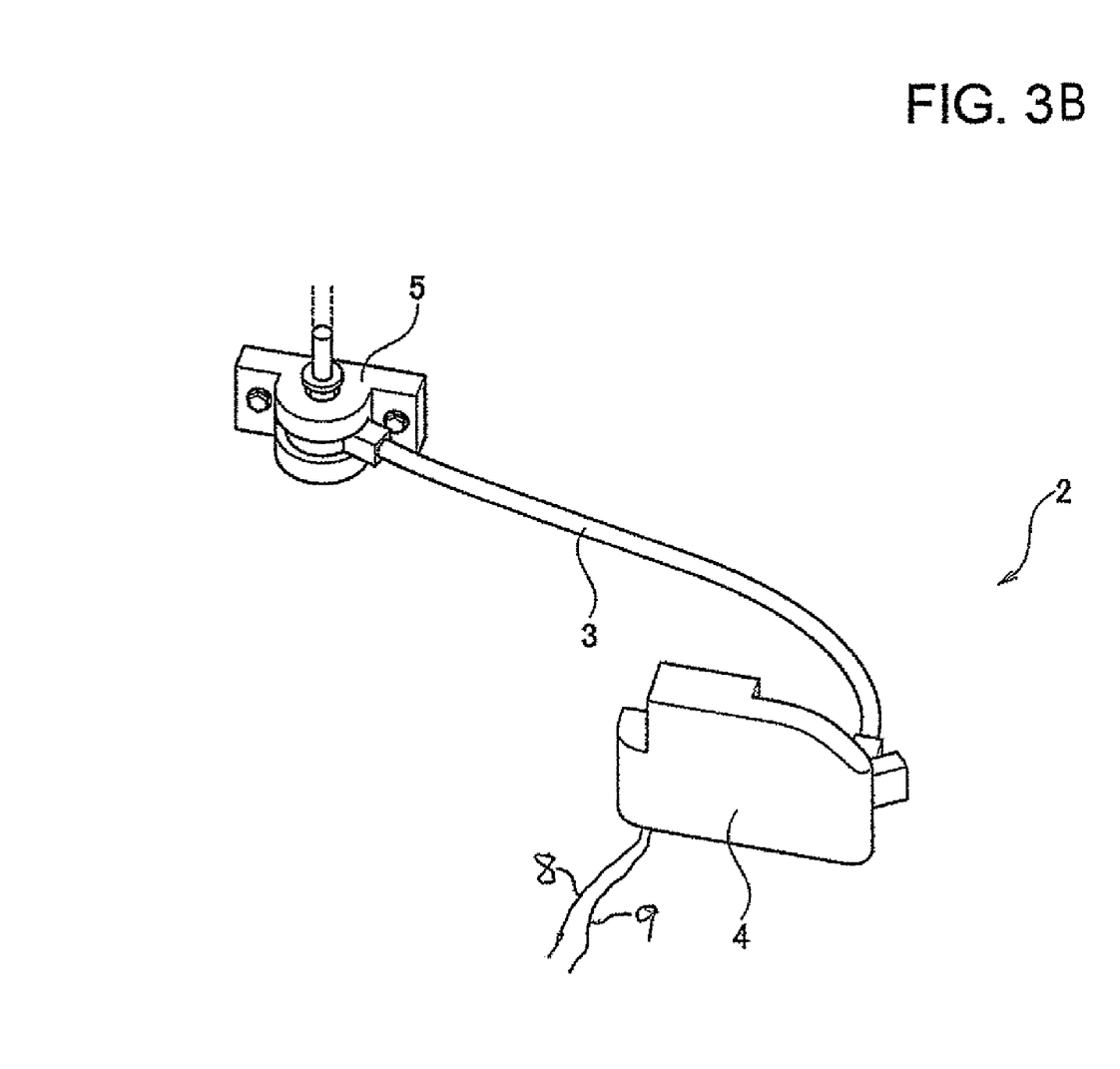
FIG. 3B is an enlarged perspective view of the feeding unit according to FIG. 1 in an open position.

A feeding unit according to certain embodiments of the invention are hereunder described with reference to the drawings. FIG. 1 shows a state of a feeding unit 2 when a slide door 1 is at a closed position. FIG. 2 shows a state of the feeding unit 2 when the slide door 1 is at an open position. FIGS. 3A and 3B are enlarged views of only the feeding unit. A connecting cable 3 and a door-side holder 5 are shown when the door 1 is closed and when it is open in FIGS. 3A and 3B, respectively.

As shown in FIGS. 1 to 3B, the feeding unit 2 according to a first embodiment includes the connecting cable 3, a vehicle-body-side holder 4 and the door-side holder 5. A signal wire 8 and a power supply wire 9 at the vehicle body side are connected to the vehicle-body-side holder 4. These wires 8, 9 are bundled up and passed through the inside of the connecting cable 3. A connection portion of the vehicle-body-side holder 4 and the connecting cable 3 is formed so as to be rotatable while following the movement of the connecting cable 3 as the slide door 1 is opened/closed as discussed in more detail hereinbelow.

Figure 4:
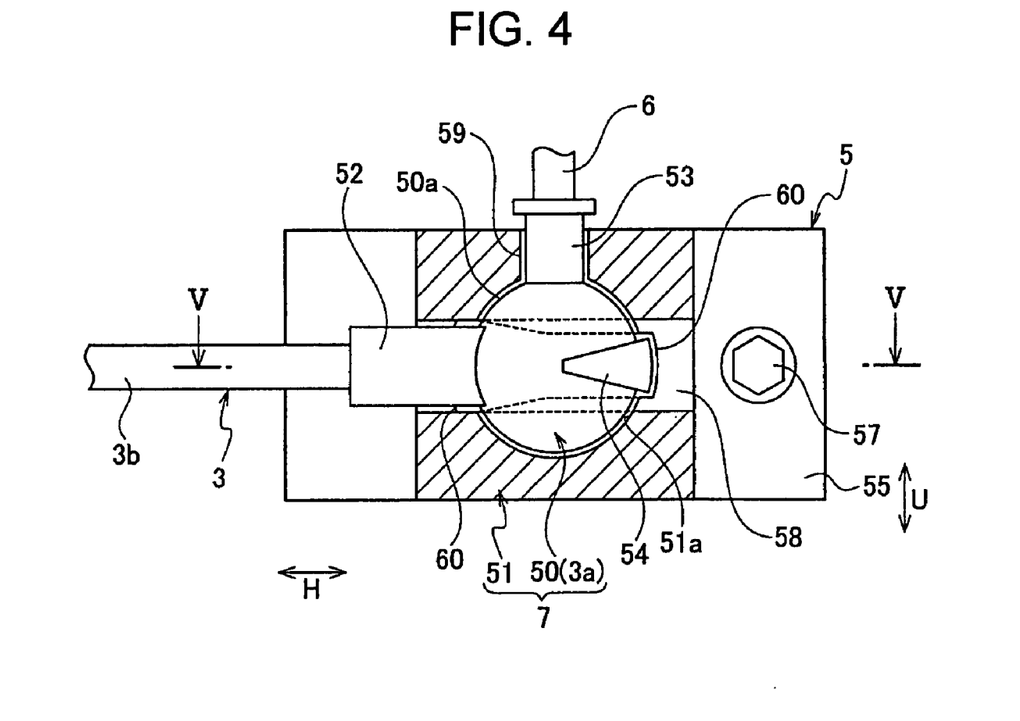
FIG. 4 is a sectional view of the feeding unit according to FIG. 1 taken along line IV-IV shown in FIG. 5.
Figure 5:
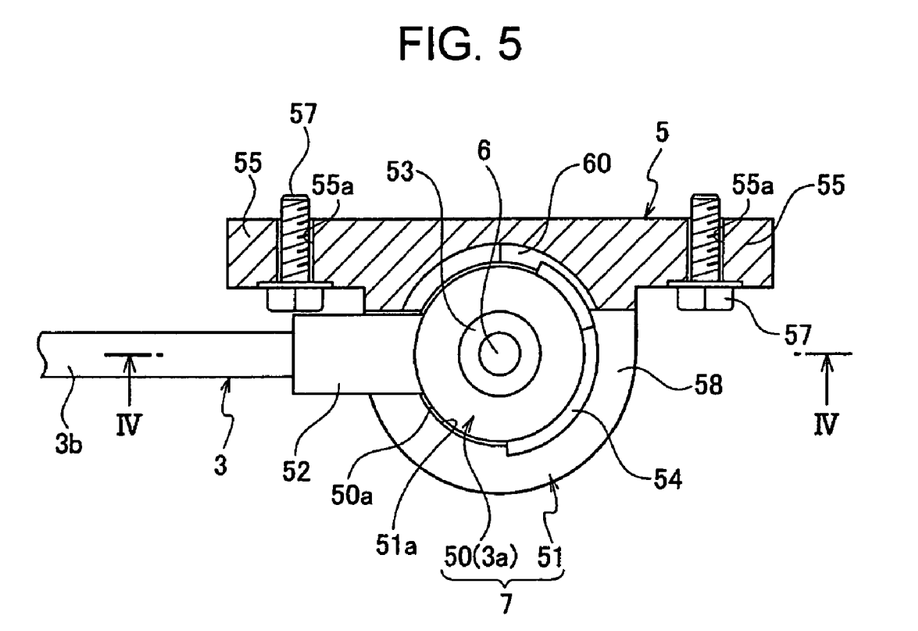
FIG. 5 is a sectional view of the feeding unit according to FIG. 1 taken along line V-V shown in FIG. 4.

As shown in FIGS. 4 and 5, an end 3a of the connecting cable 3 that is adjacent to the slide door 1 is held by a ball joint mechanism 7 so as to be movable at the door-side holder 5. More specifically, a ball 50 is provided at the end 3a of the connecting cable 3 through a sleeve 52, and a ball holding portion 51 for holding the ball 50 is provided at the door-side holder 5. The ball 50 and the ball holding portion 51 constitute the ball joint mechanism 7.

FIG. 4 is a sectional view taken along line IV-IV shown in FIG. 5, and FIG. 4 is a sectional view taken along line V-V shown in FIG. 4. However, while the ball holding portion 51 is shown in cross section, the ball 50 is not shown in cross section. Even though the ball holding portion 51 in FIGS. 4 and 5 is shown as having an integral structure, it can be two divided portions that are connected to each other so as to easily accommodate the ball 50 therein.

The ball 50 can also be formed so as to be dividable in half. The sleeve 52, which is rectangular in cross section, is interposed to prevent a portion 3b of the connecting cable 3 from becoming dislodged from the ball 50. A lead-out cable 6 connected to the connecting cable 3 and introduced in the ball 50 is led out vertically (illustrated U direction) from an upper portion of the ball 50. As with the sleeve 52, a sleeve 53 is also mounted to a lead-out portion of the lead-out cable 6. The sleeve 53 is circular in cross section. A protrusion 54 parallel to the sleeve 52 is formed at the circumference of the ball 50. The form of the protrusion 54 is such that one end of a rectangle gradually becomes smaller in width. The lead-out cable 6 and the connecting cable 3 may be connected in the ball 50 or may be formed as a continuous, integrated cable.

The door-side holder 5 has a flange 55 serving as a securing portion with respect to the slide door 1 and the ball holding portion 51 that accommodates the ball 50. The ball holding portion 51 is connected to a center of one surface of the flange 55. Through holes 55a are formed in the flange 55. By passing bolts 57 through the through holes 55a, the door-side holder 5 is secured to the slide door 1. The ball holding portion 51 has a spherical space (e.g., a spherical hollow) that accommodates the ball 50 therein. The ball holding portion 51 also has a slit 58 that guides the sleeve 52 when the ball 50 rotates. Further, the ball holding portion 51 has an insertion hole 59 that is formed perpendicularly to the slit 58 and that receives the sleeve 53.

Figure 6:
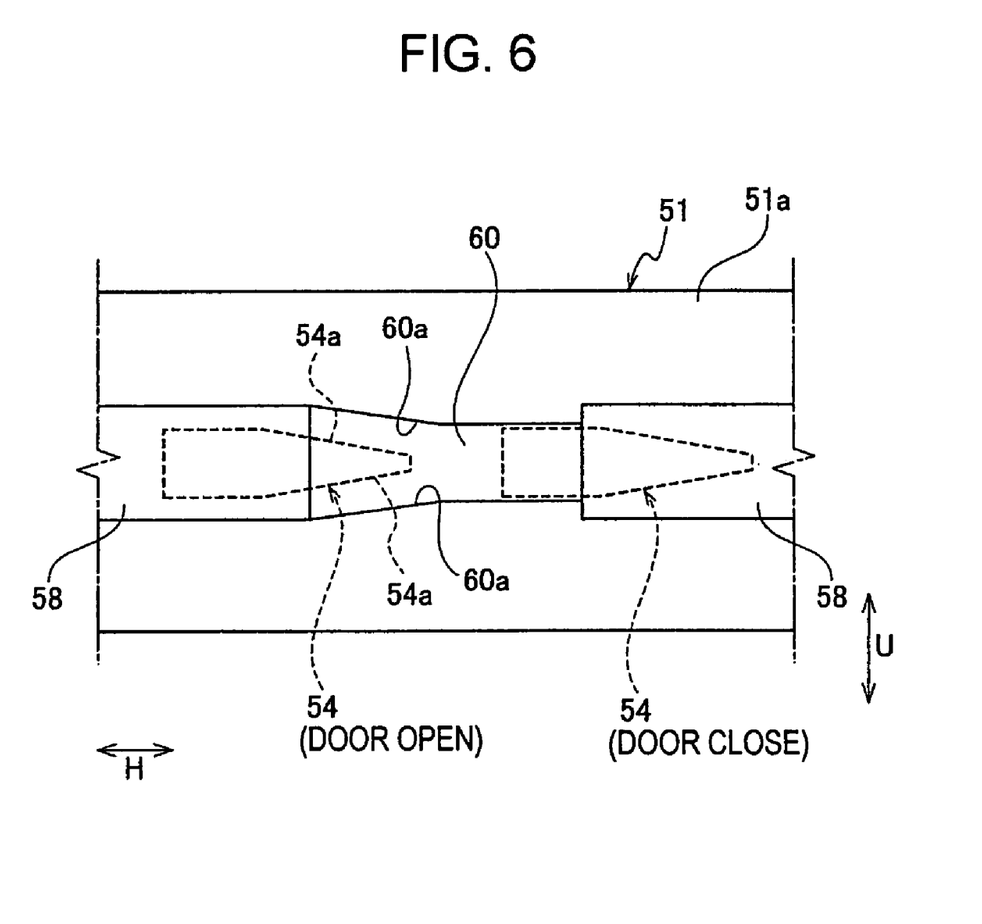
FIG. 6 is a development diagram of an internal surface of a ball holding portion.

A groove 60 that guides the protrusion 54 is formed in an inner peripheral surface 51a defining the space of the ball holding portion 51 that accommodates the ball 50. FIG. 6 is a development diagram (internal side view) of the inner peripheral surface 51a defining the space that accommodates the ball 50. FIG. 6 shows a position of the protrusion 54 in the groove 60 when the slide door 1 is completely open ("door open" position) and a position of the protrusion 54 in the groove 60 when the slide door 1 is completely closed ("door close" position). The protrusion 54 moves, and the ball 50 rotates horizontally in H directions as the slide door 1 is opened and closed. As can be seen from FIG. 6, at the "door close" position of the protrusion 54 when the slide door 1 is completely closed and within a predetermined range of the vicinity thereof, a width of the groove 60 (the vertical width, i.e., the illustrated U-direction) is substantially equal to a largest width of the protrusion 54 in the same direction.

Therefore, as the slide door 1 moves in the direction in which it is closed, the vertical width (i.e., the illustrated U-direction) of the groove 60 in correspondence with the protrusion 54 becomes smaller. The tapering protrusion 54 is guided by this groove 60 so that the protrusion 54 is smoothly moved to the "door close" position in FIG. 6. By vertically restricting the protrusion 54 by the groove 60 at the "door close" position and within the predetermined range of the vicinity thereof, rattling of the ball 50 with respect to the ball holding portion 51 (that is, rattling of the end 3a of the connecting cable 3 with respect to the door-side holder 5) is restricted. Therefore, vibration and noise produced when the vehicle travels are reduced. In such a structure, inclined side surfaces 54a defining the tapering form of the protrusion 54 correspond to first guiding portions that guide the movement of the protrusion 54 to the "door close" position. Inclined side surfaces 60a that define portions of the groove 60 whose width becomes gradually smaller correspond to second guiding portions that guide the protrusion 54 to the "door close" position.

On the other hand, the vertical width of the groove 60 is gradually increased towards the "door open position" of the protrusion 54 in the groove 60 when the slide door 1 is completely open, so that, in combination with the tapering form of the protrusion 54, the ball 50 can easily be tilted in the ball holding portion 51. When opening the slide door 1, the slide door 1 moves outside the vehicle and then slides along a side surface of the vehicle. At this time, the ball 50 that is secured to the door-side end 3a of the connecting cable 3 is rotatable both horizontally (main movement directions, or illustrated H directions) and vertically (directions perpendicular to the main movement directions, or illustrated U directions) in the ball holding portion 51. In other words, the feeding unit is formed so that when the slide door 1 is open the protrusion 54 can easily move in the groove 60. Therefore, an undue force that forcefully acts between the ball 50 and the ball holding portion 51 is restricted.

As mentioned above, when the slide door 1 is opened or closed, the ball 50 tilts with respect to the ball holding portion 51, but the tilting is restricted by an edge defining the insertion hole 59 coming into contact with the sleeve 53. When an attempt is made to restrict the tilting of the ball 50 by bringing an inner surface defining the groove 60 into contact with a side of the protrusion 54, horizontal (illustrated H-direction) rotation of the ball 50 is restricted by frictional resistance occurring due to surface contact. However, when the tilting of the ball 50 is restricted by bringing the edge defining the insertion hole 59 into contact with the sleeve 53 as mentioned above, the contact is a point contact, so that frictional resistance is very small. Therefore, a significant problem related to frictional resistance does not occur. When the tilting of the ball 50 is too large, an undue force may act upon a wire. This problem is prevented in the above-described structure. In addition, it is possible to restrict wear and chipping of the internal surface defining the groove 60 and the protrusion 54.

The above-described structure makes it possible to reduce the number of movable parts and costs. In addition, since the ball joint mechanism 7 is used, a degree of freedom in a movement direction is increased. Hence, a slight positional displacement between parts can be absorbed so that the slide door 1 can be opened and closed without undue force acting upon each part.

Although not illustrated, it is desirable that the connecting cable 3 be accommodated in a corrugated pipe that is oval or elliptical in cross section. The corrugated pipe has the form of a bellows, and its long axis in cross section is disposed vertically. When such a structure is used, the connecting cable 3 does not hang downward, and the connecting cable 3 can be flexibly horizontally bent when opening and closing the slide door 1.

In the above-described embodiment, the ball 50 has the protrusion 54 at its outer peripheral surface 50a, and the ball holding portion 51 has the groove 60 at its inner peripheral surface 51a for accommodating the protrusion 54. By restricting the vertical movement of the protrusion 54 by the groove 60, the end 3a of the connecting cable 3 is formed so as to be vertically stopped by the door-side holder 5.

The groove width value where the slide door 1 is open and which corresponds with the protrusion 54 is larger than the groove width value where the slide door 1 is closed and which corresponds with the protrusion 54.

By this, when the slide door 1 is closed, rattling of the protrusion 54 is restricted by the groove 60 so that rattling of the ball 50 in the ball holding portion 51 is restricted. As a result, generation of vibration noise is restricted. On the other hand, the protrusion 54 can move freely to a certain degree in the groove 60 when the slide door 1 is open. Therefore, the ball 50 can move and tilt flexibly in the ball holding portion 51 as the slide door 1 is opened.

In this embodiment, the ball holding portion 51 has the insertion hole 59 that receives the lead-out cable 6. Therefore, tilting of the lead-out cable 6 by an amount that is equal to or greater than a predetermined amount is restricted as a result of bringing the lead-out cable 6 into contact with the edge defining the insertion opening 59.

Accordingly, restricting the tilting of the lead-out cable 6 with respect to the ball holding portion 51 by an amount that is equal to or greater than a predetermined amount by bringing the lead-out cable 6 (sleeve 53) into contact with the edge defining the insertion hole 59 makes it possible to restrict load that is exerted upon the lead-out cable 6 and the connecting cable 3.

The feeding unit is not limited to the above-described embodiment. For example, the ball joint mechanism is only provided at the holder at the slide door side in this embodiment, but it may be provided at the vehicle-body-side holder. In such a case, when the structure according to the above-described embodiment including the protrusion and groove is used, it is possible to provide the same advantages as those provided by this structure. In addition, when the structure according to the embodiment in which the lead-out cable (sleeve) and the edge defining the insertion hole are brought into contact with each other is used, it is possible to provide the same advantages as those provided by this structure.

In addition, although the ball is provided at the end of the connecting cable and the ball holding portion is provided at the holder, the invention is not limited to this structure. For example, a structure in which the ball holding portion is provided at the end of the connecting cable and the ball is provided at the holder may also be used.

Herein, the protrusion is provided at the outer peripheral surface of the ball and the groove is formed at the inner peripheral surface of the ball holding portion. A structure in which the groove is formed at the outer peripheral surface of the ball and the protrusion is formed at the inner peripheral surface defining the ball holding portion may also be used.

Also, the above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A feeding unit for supplying electrical power, the feeding unit comprising:
    a connecting cable mounted between a vehicle body and a slide door, wherein the slide door is mounted to a side surface of a vehicle, and wherein the connecting cable is configured to supply electrical power from a side of the vehicle body;
    a holder for mounting a portion of the connecting cable to the vehicle body or the slide door and fixedly mounted thereto, wherein the holder holds the portion of the connecting cable so that the portion of the connecting cable is rotatable vertically and horizontally, and wherein the holder vertically stops the portion of the connecting cable when the slide door is at a closed position; and
    a ball including a cable opening and being fixedly engaged with the portion of the connecting cable for movement therewith; and wherein
    the holder includes an inner peripheral surface substantially surrounding the ball and a first opening aligned with the cable opening and extending to a vertically-extending, external surface of the holder such that the portion of the connecting cable extends through the first opening and the cable opening, the ball being rotatable within the inner peripheral surface.

2. The feeding unit according to claim 1 wherein the holder mounts the portion of the connecting cable to the slide door.

3. The feeding unit according to claim 1 wherein the portion of the connecting cable is an end of the connecting cable.

4. The feeding unit according to claim 3, further comprising:
    a protrusion located at an outer peripheral surface of the ball or the inner peripheral surface of the holder; and
    a groove sized to accommodate the protrusion, wherein the groove is located at the other of the outer peripheral surface of the ball or the inner peripheral surface of the holder; and wherein the groove is configured to restrict vertical movement of the protrusion to vertically stop the end of the connecting cable from vertically moving at the holder.

5. The feeding unit according to claim 4 wherein the holder has an insertion hole, the feeding unit further comprising:
    a lead-out cable extending vertically from the ball and through the insertion hole wherein tilting of the lead-out cable is restricted by the edge defined by the insertion hole.

6. The feeding unit according to claim 1, further comprising:
    a protrusion located at an outer peripheral surface of the ball; and
    a groove sized to accommodate the protrusion, wherein the groove is located at the inner peripheral surface of the holder; and wherein the groove is configured to restrict vertical movement of the protrusion to vertically stop the portion of the connecting cable from vertically moving at the holder.

7. A feeding unit for supplying electrical power, the feeding unit comprising:
    a connecting cable mounted between a vehicle body and a slide door, wherein the slide door is mounted to a side surface of a vehicle, and wherein the connecting cable is configured to supply electrical power from a side of the vehicle body;
    a holder for mounting a portion of the connecting cable to the vehicle body or the slide door, wherein the holder holds the portion of the connecting cable so that the portion of the connecting cable is rotatable vertically and horizontally, and wherein the holder vertically stops the portion of the connecting cable when the slide door is at a closed position;

a ball located at the portion of the connecting cable or the holder;

a ball holding portion located at the other of the portion of the connecting cable or the holder, the ball holding portion holding the ball;

a protrusion located at an outer peripheral surface of the ball or an inner peripheral surface of the ball holding portion; and a groove sized to accommodate the protrusion, wherein the groove is located at the other of the outer peripheral surface of the ball or the inner peripheral surface of the ball holding portion; and wherein the groove is configured to restrict vertical movement of the protrusion to vertically stop the portion of the connecting cable from vertically moving at the holder.

8. The feeding unit according to claim 7 wherein the ball is located at the portion of the connecting cable, and the ball holding portion is located at the holder.

9. The feeding unit according to claim 7 wherein the protrusion is located at the outer peripheral surface, and the groove is located at the inner peripheral surface of the ball holding portion.

10. The feeding unit according to claim 7 wherein the groove has a first vertical width when the slide door is in an open position and the groove corresponds to the protrusion, and the groove has a second vertical width when the slide door in the closed position and the groove corresponds to the protrusion; and wherein the first vertical width is greater than the second vertical width.

11. The feeding unit according to claim 10, further comprising:

a first guiding portion of the protrusion configured to guide movement of the protrusion from an area about the first vertical width to an area about the second vertical width.

12. The feeding unit according to claim 10 wherein the groove has a second guiding portion configured to guide movement of the protrusion from the area about the first vertical width to the area about the second vertical width.

13. The feeding unit according to claim 7 wherein the ball holding portion has an insertion hole, the insertion hole defining an edge, the feeding unit further comprising:

a lead-out cable extending vertically from the ball and through the insertion hole wherein tilting of the lead-out cable is restricted by the edge defined by the insertion hole.

14. The feeding unit according to claim 13, further comprising:

a sleeve mounted to the lead-out cable; and wherein the tilting of the lead-out cable is restricted by contact of the sleeve and the edge defined by the insertion hole.

15. A holding device of a cable, comprising:

a holder for holding a section of the cable, wherein the holder is configured to allow the section of the cable to rotate in a first main movement direction and a second movement direction perpendicular to the first main movement direction when the cable is at a first position on a line in the first main movement direction, and wherein the holder is further configured to stop the rotation of the section of the cable in the second movement direction when the cable is in a second position on the line in the first main movement direction; and a ball including a cable opening and being fixedly engaged with the section of the cable for movement therewith; and wherein the holder includes an inner peripheral surface substantially surrounding the ball and a first opening aligned with the cable opening and extending to a vertically-extending, external surface of the holder such that the section of the cable extends through the first opening and the cable opening, the ball being rotatable within the inner peripheral surface.

16. The holding device according to claim 15 wherein the holder is mounted on a sliding door mounted to a side surface of a vehicle and the cable extends from the holder to the side surface of the vehicle.

17. The holding device according to claim 15, further comprising:

a protrusion located at an outer peripheral surface of the ball or the inner peripheral surface of the holder; and a groove sized to accommodate the protrusion, wherein the groove is located at the other of the outer peripheral surface of the ball or the inner peripheral surface of the holder; and wherein the groove is configured to restrict vertical movement of the protrusion to vertically stop the section of the cable from vertically moving at the holder.

18. The holding device according to claim 17 wherein the protrusion is located at the outer peripheral surface of the ball, and the groove is located at the inner peripheral surface of the holder.

* * * * *